(12) United States Patent
Anderson

(10) Patent No.: US 8,069,647 B2
(45) Date of Patent: *Dec. 6, 2011

(54) JET NOZZLE MIXER

(75) Inventor: Jack H. Anderson, Del Mar, CA (US)

(73) Assignee: Comtran Limited, St. Peter Port (GB)

( * ) Notice: Subject to any disclaimer, the term of this patent is extended or adjusted under 35 U.S.C. 154(b) by 294 days.

This patent is subject to a terminal disclaimer.

(21) Appl. No.: 11/491,993

(22) Filed: Jul. 25, 2006

(65) Prior Publication Data

US 2011/0265448 A1   Nov. 3, 2011

Related U.S. Application Data

(63) Continuation of application No. 11/027,981, filed on Jan. 4, 2005, now Pat. No. 7,111,448, which is a continuation of application No. 10/314,101, filed on Dec. 7, 2002, now Pat. No. 6,854,260.

(60) Provisional application No. 60/340,369, filed on Dec. 7, 2001.

(51) Int. Cl.
*F02K 1/54* (2006.01)
*F02K 1/46* (2006.01)

(52) U.S. Cl. ............. 60/204; 60/226.1; 60/262; 60/770; 239/265.17; 181/220

(58) Field of Classification Search ............. 60/204, 60/226.2, 262, 264, 770; 239/265.17, 265.19; 181/213, 220
See application file for complete search history.

(56) References Cited

U.S. PATENT DOCUMENTS

| | | | |
|---|---|---|---|
| 3,048,975 A | 8/1962 | Keen | |
| 3,084,507 A | 4/1963 | Kleinhans et al. | |
| 3,568,792 A | 3/1971 | Urquhart | |
| 3,572,464 A | 3/1971 | MacDonald | |
| 3,601,340 A | 8/1971 | Hilbig | |
| 3,612,212 A | 10/1971 | Macdonald | |
| 3,696,617 A | 10/1972 | Ellis | |
| 3,749,316 A | 7/1973 | Tontini | |
| 3,776,363 A | 12/1973 | Kuethe | |
| 3,982,696 A | 9/1976 | Gordon | |
| 4,117,671 A | 10/1978 | Neal et al. | |
| 4,254,620 A | 3/1981 | Wright et al. | |
| 4,335,801 A | 6/1982 | Stachowiak et al. | |
| 4,422,524 A | 12/1983 | Osborn | |

(Continued)

FOREIGN PATENT DOCUMENTS

EP       0635632       2/1995

(Continued)

*Primary Examiner* — Ted Kim

(74) *Attorney, Agent, or Firm* — Charles W. Hanor

(57) ABSTRACT

An external jet nozzle mixer includes identically formed lobes. The external mixer works with the internal mixer further to mix the engine internal bypass flow with the internal jet engine core flow to level the disparate flow velocities, to reduce the peak velocities from the jet engine core and increase the lower bypass velocities of the engine internal bypass flow, and thereby reduce noise. The internal lobe contours act as lifting flutes, causing mixing of the primary hot and cold flows to mix before exiting the nozzle. The external lobe contours act as venturi chutes, accelerating the cooler ambient secondary air flow. The lobes thus act collectively as an injector to force the cooler ambient secondary flow into the previously mixed primary flow as it exits the nozzle. Also obtained is an increased thrust efficiency and, consequently, decreased fuel consumption and engine emissions.

5 Claims, 13 Drawing Sheets

U.S. PATENT DOCUMENTS

| | | |
|---|---|---|
| 4,548,034 A | 10/1985 | Maguire |
| 4,592,201 A | 6/1986 | Dusa et al. |
| 4,666,104 A | 5/1987 | Kelber |
| 4,813,230 A | 3/1989 | Braithwaite |
| 5,127,602 A | 7/1992 | Batey et al. |
| 5,157,916 A | 10/1992 | Wynosky et al. |
| 5,222,359 A | 6/1993 | Klees et al. |
| 5,440,875 A | 8/1995 | Torkelson et al. |
| 5,592,813 A | 1/1997 | Webb |
| 5,706,651 A | 1/1998 | Lillibridge et al. |
| 5,761,900 A | 6/1998 | Presz, Jr. |
| 5,884,472 A | 3/1999 | Presz, Jr. et al. |
| 6,233,920 B1 | 5/2001 | Presz et al. |
| 6,854,260 B2 | 2/2005 | Anderson |
| 7,111,448 B2 * | 9/2006 | Anderson ............ 60/204 |

FOREIGN PATENT DOCUMENTS

| | | |
|---|---|---|
| GB | 2123486 | 2/1984 |
| GB | 2207468 | 8/1989 |

* cited by examiner

Fig. 5-1
Fig. 5-2
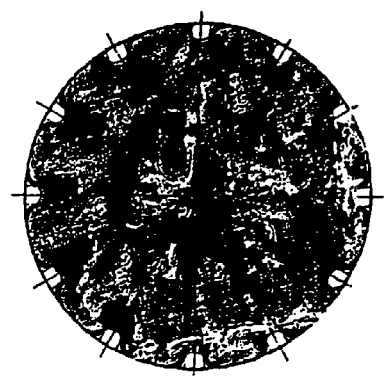
Fig. 5-3
Fig. 5-4
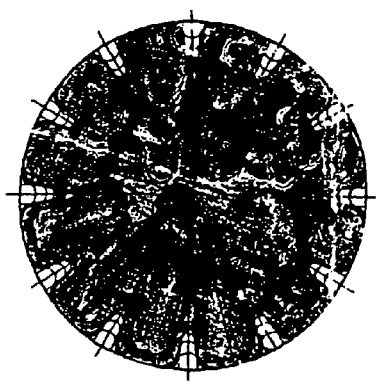
Fig. 5-5
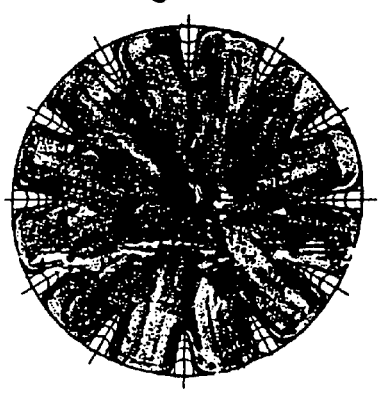

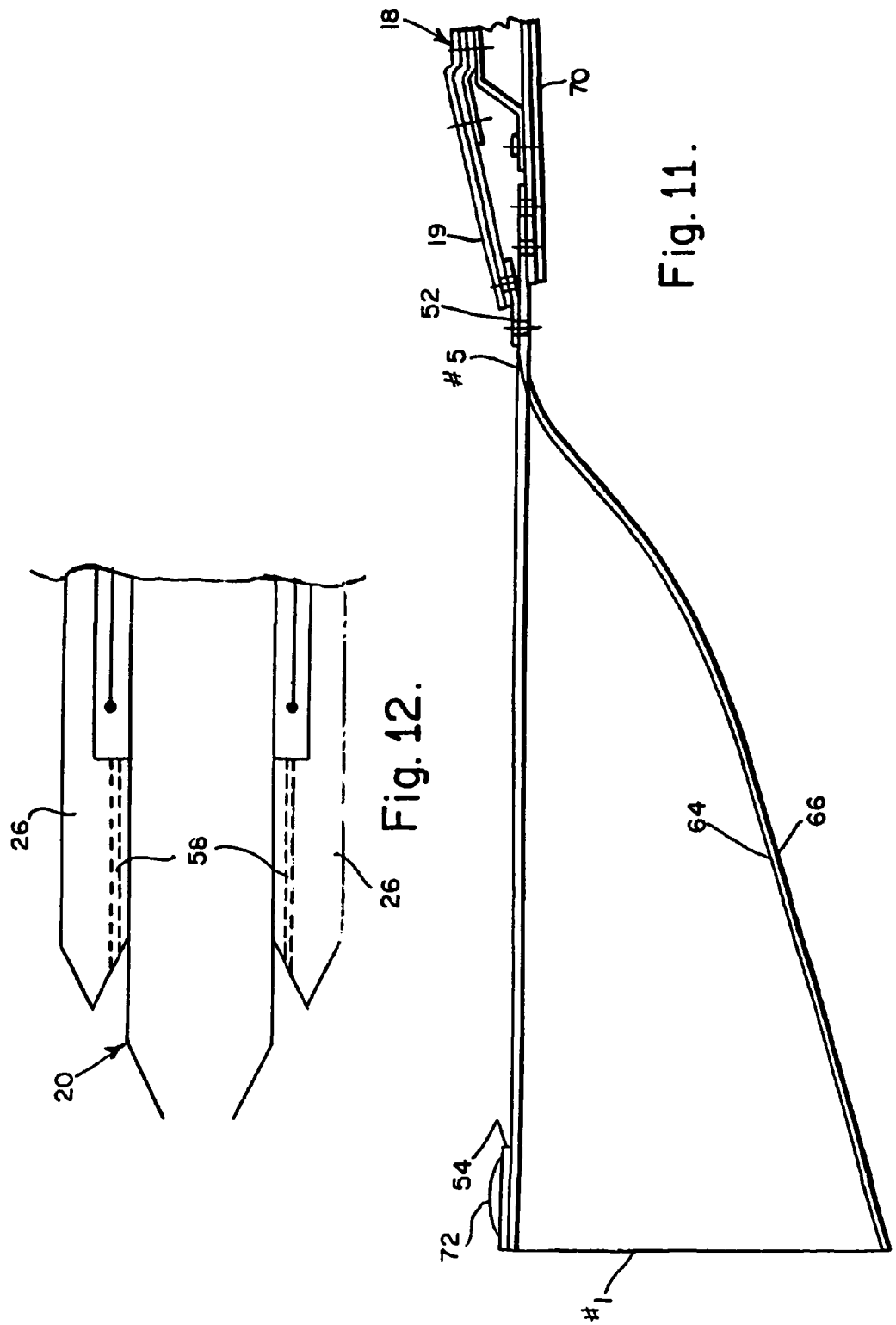

JET NOZZLE MIXER

CROSS-REFERENCE TO RELATED APPLICATIONS

This application is a continuation of application Ser. No. 11/027,981, filed Jan. 4, 2005 and issued as U.S. Pat. No. 7,111,448 on Sep. 26, 2006, which is a continuation of application Ser. No. 10/314,101, filed Dec. 7, 2002 and issued as U.S. Pat. No. 6,854,260 on Feb. 15, 2005, and claims the benefit of U.S. Provisional Application No. 60/340,369, filed Dec. 7, 2001, each of the applications are incorporated herein by reference thereto, respectively.

FIELD OF THE INVENTION

The present invention relates to jet nozzle mixers for aircraft jet engines and, in particular, to improvements in effecting a greater cooling and a lower noise level in exhaust gases emanating from such engines and in increasing power and fuel efficiency.

BACKGROUND

Noise (decibel) level in jet aircraft engines is established by laws and regulations, specifically promulgated by the International Civil Aviation Organization (ICAO), Annex 16. At present, commercial jet aircraft weighing over 75,000 pounds (34,000 kilograms) must meet Stage 3/Chapter 3 noise (decibel) level requirements which establish an allowable decibel noise level. Under Annex 16 Stage 4/Chapter 4 requirements, a lower maximum (decibel) level will be mandated, by at least a reduction of 10 decibels from current Stage 3/Chapter 3 levels. Such noise reduction is effected by mixing of the primary hot exhaust gases in an internal mixer with secondary bypass cooling air and by breaking of the single core of exhaust gases into a plurality of smaller cores through use of a first set of lobes positioned internally in the engine. For some engines, a second set of lobes in an external mixer is positioned downstream from the first set at the terminus of the engine. A thrust reverser module is joined to the engine housing or fan case at the engine terminus by use of an attendant mechanism covered by the STANG fairing. Because the engine has specifically designed dimensions, the second set of lobes must be configured to accommodate the existing engine design, which has a terminus exit area dimension of 1,100 square inches (7,097 square centimeters), rather than to reconfigure the engine to fit the second set of lobes. Such engine reconfiguration is impractical and expensive. Therefore, the direction towards meeting Stage 3/Chapter 3 noise requirements has been involved in developing a variously configured second set of lobes whose design does not always meet such requirements and, when the lobe design does, the lobes are difficult and expensive to manufacture and the mixer is expensive to be retrofitted to the engine. Some engines have not employed the use of a second set of lobes or an external mixer, specifically one produced by Pratt & Whitney, in their JT8D-217/219 Series. Currently, this engine includes an internal 12 lobe mixer and is only certified to Stage 3/Chapter 3 noise levels. There has been a desire to qualify this particular engine to Stage 4/Chapter 4 noise levels, but to minimize the costs of doing so with, preferably, no changes in its thrust reversal components primarily because of cost and other economic reasons. To bring this engine to Stage 4/Chapter 4 noise levels, an additional 2 decibel reduction in jet noise is required. Such an upgrading is a challenge that has not been met.

BRIEF SUMMARY OF THE ILLUSTRATED EMBODIMENTS OF THE INVENTION

These and other problems are avoided and the Stage 4/Chapter 4 requirements are both met and surpassed by the present invention, not only for the above-mentioned Pratt & Whitney JT8D-217/219 Series engine but also for other engines. The second stage or external jet nozzle mixer of the present invention includes a number of lobes, which may be equal in number to those of the first stage or internal mixer, and all of the second stage mixer lobes may be identically formed. As the lobes axially extend outwardly from the mixer attachment to the engine nozzle, they axially inwardly expand from an essentially circular base to an undulating configuration whose apices increase in height. The lobes include complex curvatures whose interior and exterior surfaces greatly enhance mixing respectively of the previously mixed bypass cooling air-hot exhaust gases from the internal mixer and additional ambient cooling air, and thereby also reduce noise. At their terminus, the area encompassed by the lobes remains essentially the same (1,065 to 1,120 sq. inches) as for the jet engine for which it is designed which, for the Pratt & Whitney JT8D-217/219 Series engine, is 1,095 to 1,105 square inches (6,089 to 7,097 square centimeters). For other engines, the lobe terminus area is consistent with that of the engine in question.

For the Pratt & Whitney JT8D-217/219 Series engine, for example, the external mixer length is 12 inches±3 inches (30.45 cm±8 cm). The essentially circular base of the lobes at the mixer inlet has a linear dimension of 39.7 inches (101 centimeters) round, providing an area of 1,223 sq. inches (7,891 square centimeters). At the mixer outlet at the full height of the regularly undulating lobes, the dimension of the mixer circumscribing the lobes at their greatest height is also 39.7 inches (101 centimeters) diameter but, because of the scalloped lobe shape, the area enclosed by the lobes is 1,065 to 1,120 sq. inches (6,089 to 6,403 square centimeters), which matches the area of the existing tailpipe.

The exit shape has elliptical shaped lobes and is proportional to a 10×2.5 ellipse (plus or minus 2 inch major axis, and ±0.5 inch minor axis). These curve sides help resist distortion caused by the exhaust gas pressure.

Consistent with the above discussion, an important and preferred design parameter is to shape the external mixer of the present invention with a generally cylindrical configuration and with as short a length as possible, so that it does not interfere with the existing thrust reverser doors at the end of the tailpipe. As a result, the mixer of the present invention permits the use of existing thrust reversers without necessitating any modification thereto. Only a part of the STANG fairings need to be slightly decreased in their inner dimensions to accommodate the internal mixer. Also, the existing tailpipe is shortened by about 5 inches (12.7 centimeters).

Functionally, the interior surfaces of the lobes force the impinging hot gases, as previously mixed with the secondary bypass cooling air by the first set of lobes of the internal mixer, in all directions towards the interior of the mixer, essentially 45° to 60°, to effect a vigorous mixing of the gases. Simultaneously, additional ambient cooling air is forced from the exterior surfaces of the lobes to mix further with the internally mixed gases. These actions cause the smaller gas cores, which were formed by the first stage mixer, to break into innumerable forms which are both cooler and considerably noise attenuated. In part, the internal contours of the lobes act as flutes to produce a lifting effect which causes the primary hot and cold flows to mix before entering the nozzle. The external contours of the lobes act as chutes which produce a venturi effect and accelerate the cooler secondary flow of ambient air. The lobes thereby act collectively as an injector to force the cooler ambient secondary flow into the previously mixed primary flow as it exits the nozzle. These actions further reduce the noise level. Further, the curve sides of the lobes help resist distortion caused by the exhaust gas pressure. An ameliorative further result is that the accelerated gas/air flow helps to faster move large, previously slowed mixtures to increase the efficiency of the jet engine, by increasing its thrust, that is, an increased thrust specific fuel consumption (TSFC) is estimated to be about a 3% improvement. Such increased TSFC occurs through better dynamic mixing of the bypass or fan duct and turbine exhaust gases. It addresses the problem of the transfer from a hot, high velocity volume to a cooler, slower velocity volume. This mixing levels the disparate flow velocities attendant with the jet engine exhaust, reduces the peak velocities from the jet engine core and increases the lower bypass velocities of the jet engine internal bypass flow. Because noise is a function of jet exhaust velocity to the $7^{th}$ power, and because peak velocities from the core flow are reduced, the jet noise is thereby reduced.

As stated above, the axial length of the mixer of the present invention is 12 inches±3 inches, which means that there is a lesser distance between the nozzle exit and the buckets of the thrust reverser. The effect of such decreased distance is that more of the thrust from the engine is captured by the buckets and thus utilized to brake the aircraft when needed.

Several advantages are derived from this arrangement. The jet nozzle mixer of the present invention fits within and is attachable to the existing engine exit whose area which, as stated above, is 1,095-1,105 square inches (6,261-7,129 square centimeters) exit area for the Pratt & Whitney JT8D-217/219 Series engine. The lobes of the present invention can be made uniform and easily tailored to provide an efficient mixing of the exhaust gases with the ambient air and the attendant reduction in noise. Its uniform dimensions enables its manufacturing costs to be reduced. The need to modify the existing thrust reverser per se is avoided because the mixer is fittable and attachable to the existing engine exit; only minor dimensional changes in the existing STANG fairing, and tailpipe and outer barrel are required without otherwise needing any change in other components such as the thrust reverser, the thrust reverser doors, and their linkages. Efficiency in jet engine operation is increased, with concomitant saving of fuel and costs thereof. Thrust reverser braking of the aircraft is improved.

Other aims and advantages, as well as a more complete understanding of the present invention, will appear from the following explanation of an exemplary embodiment and the accompanying drawings thereof.

BRIEF DESCRIPTION OF THE DRAWINGS

FIGS. 5-1 through 5-5 illustrate the areas incorporated by the lobes at their respective cross-sections #1-#5. The cross-sections, as portrayed or positioned on the interior surfaces of the lobes, define interior mixer areas within their respective planes, respectively of 1,100 square inches (7,097 square centimeters) at plane #1 (FIG. 5-1), 1,110 square inches (7,162 square centimeters) at plane #2 (FIG. 5-2), 1,120 square inches (7,226 square centimeters) at plane #3 (FIG. 5-3), 1,154 square inches (7,445 square centimeters) at plane #4 (FIG. 5-4), and 1,223 square inches (7,891 square centimeters) at plane #5 (FIG. 5-5) which extends into plane 6 for attachment to the existing Pratt & Whitney JT8D-217/219 Series engine.

FIG. 11 is a view of a specific one of the section curvatures shown in FIG. 9 along with hardware for its attachment to the nozzle or tailpipe.

FIG. 12 is a schematic drawing, not to scale, of an engine nozzle assembly and modified STANG fairings for accommodating the jet nozzle mixer embodied in the present invention.

DETAILED DESCRIPTION OF THE INVENTION

Because the present invention was devised particularly with respect to the Pratt & Whitney JT8D-217/219 Series engine, the following discussion will be directed specifically thereto; however, it is to be understood that the present invention is equally relevant for use in other jet engines and, therefore, is not to be limited to a specific jet engine.

Figure 1A:
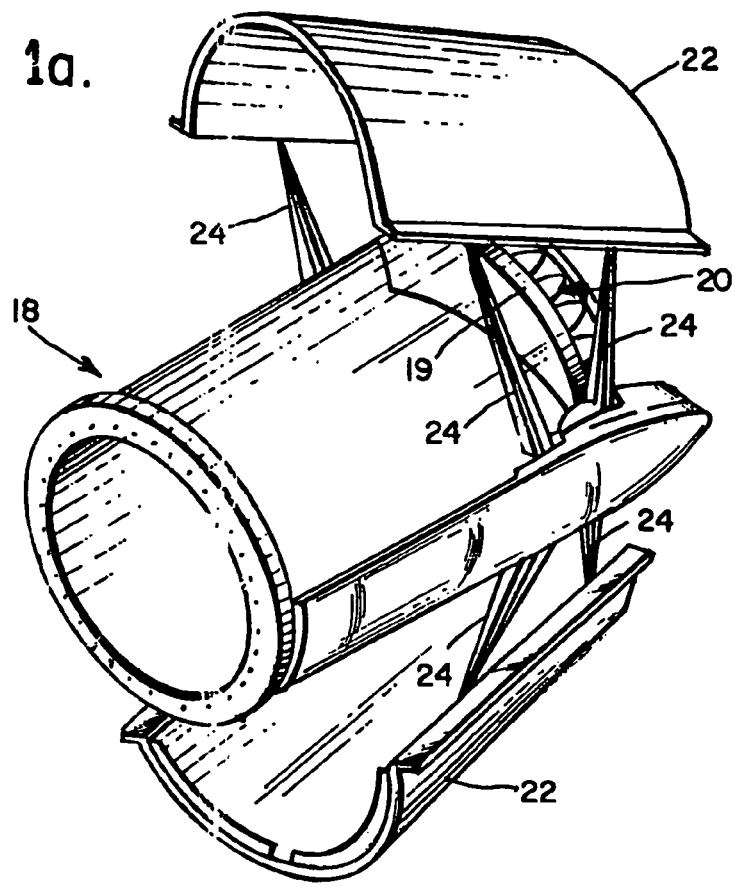
FIGS. 1a and 1b are perspective views of an end portion of a jet engine nozzle assembly to which is attached both a thrust reverser and a second stage external jet nozzle mixer as embodied in the present invention.
Figure 1B:
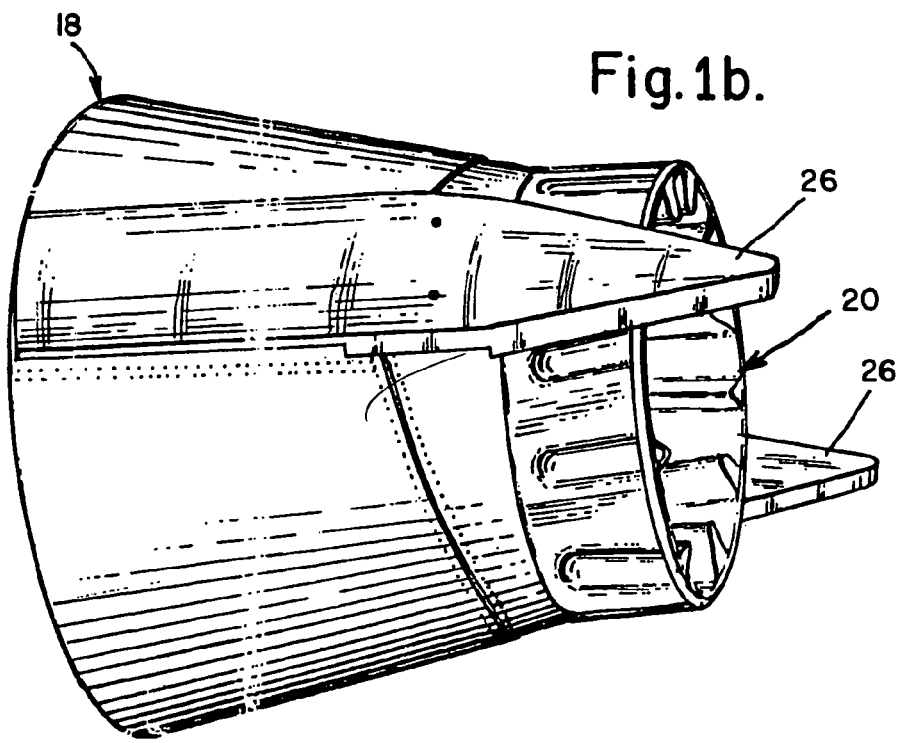

Accordingly, FIGS. 1a and 1b illustrate a nozzle assembly 18 relating to, for example, a Pratt & Whitney JT8D-217/219 Series jet engine to which a jet nozzle mixer 20 as embraced by the present invention is attached at its exhaust terminus 19. Assembly 18 also supports a thrust reverser having a pair of thrust reverser buckets 22. The attachment of the thrust reverser buckets to assembly 20 is effected by bars 24 which are pivotally linked to a pair of diametrically opposed mechanisms housed within fairings 26, one of which is shown in FIG. 1. The fairings are secured at opposite sides of the assembly. The thrust reversers and the linking bars are of conventional design and are unmodified when coupled with the present invention. The fairings are also of conventional design, but a part of the structure covered thereby is slightly modified as will be explained below with respect to FIGS. 12 and 13.

Figure 2:
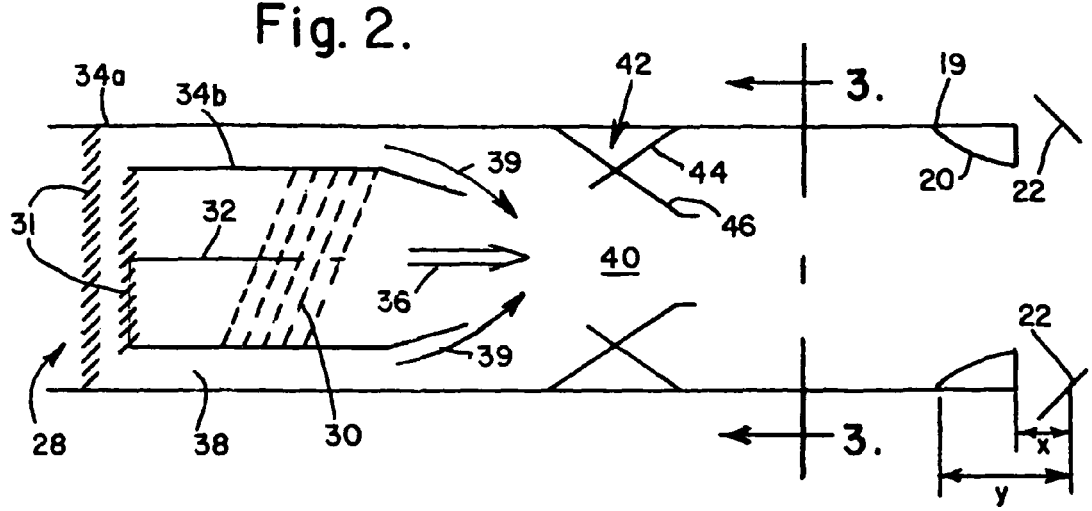
FIG. 2 is schematic drawing illustrating the interior of the jet engine shown in FIG. 1 with a known first stage internal mixer in the interior of the engine and the second stage inventive external jet nozzle mixer at the terminus of the engine, including the decrease in distance between the jet nozzle mixer of the present invention and the thrust reverser buckets, as compared to its non-use.

As shown also in FIG. 2, mixer 20, because of its added axial length, is positioned closer to thrust reverser buckets 22 when they are deployed as brakes. Such closer positioning is demonstrated by the different lengths "x" and "y" of FIG. 2. The ameliorative result of such closer positioning permits the buckets to capture a greater portion of the exhaust for braking purposes than previously obtainable. However, it is important that mixer 20 not be located too close to buckets 22 so that the flow of the redirected exhaust gases are not adversely affected and that the doors, linkages and the mixer are not deleteriously stressed.

Figure 3A:
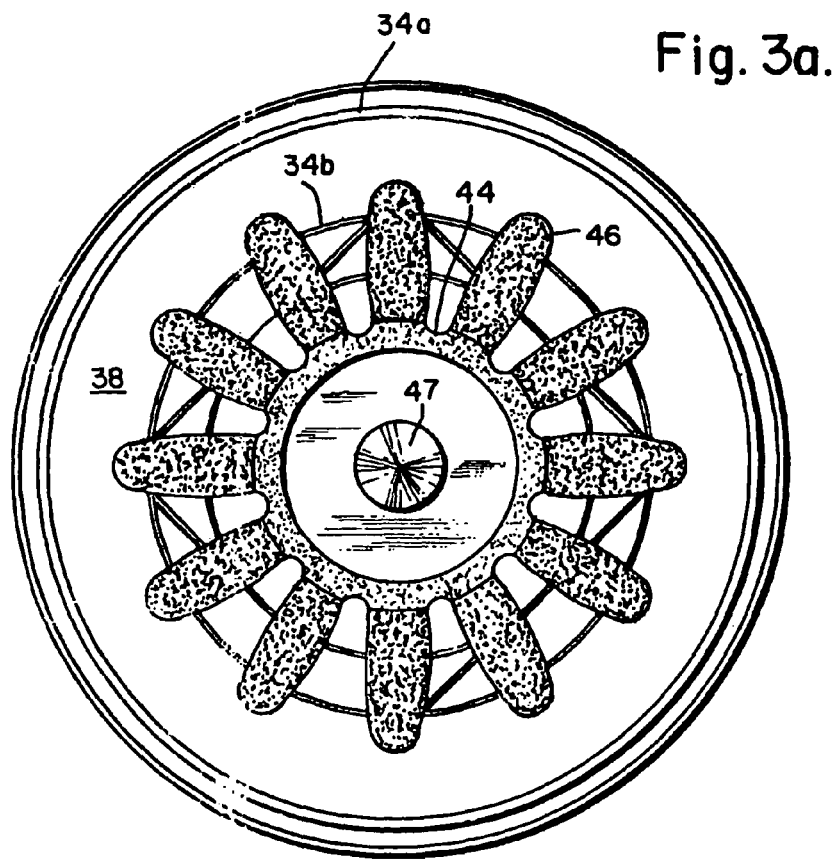
FIG. 3a is a view of the engine and its internal mixer shown in FIG. 2 taken along line 3-3 thereof.
Figure 3B:
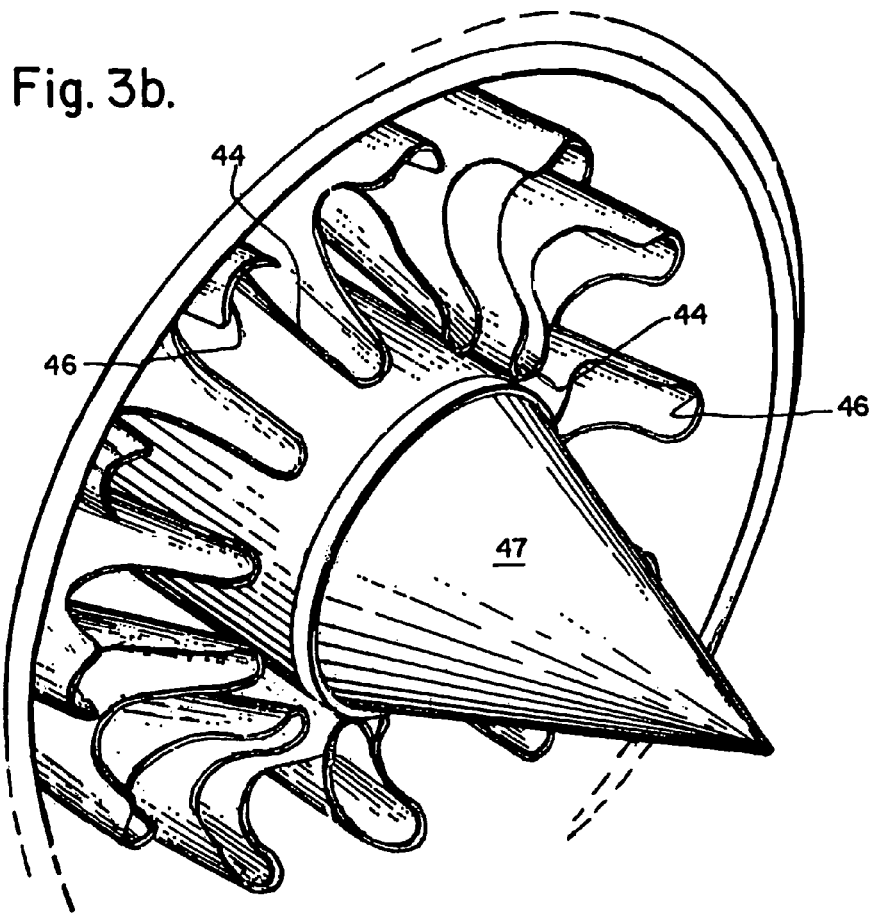
FIG. 3b is a perspective view of the cone and surrounding vanes of the internal mixer.

The internal arrangement of nozzle assembly 18 as secured to a jet engine is depicted in FIGS. 2, 3a and 3b. An engine 28 includes turbine blades 30 and compressor or fan blades 31 joined together on a common shaft 32 within a two-part housing 34a and 34b. For convenience, the burners preceding turbine blades 30 are not shown. Hot exhaust gases exit from the turbine blades as a core 36. A bypass or fan duct 38 surrounds housing 34b for affording passage of cooling air, as denoted by arrow-headed lines 39, from the ambient exterior to first stage or internal jet nozzle mixer 42 of the engine. Core 36 of hot gases is disposed to be mixed with the cooling air within a first stage mixing chamber 40 by use of first stage jet nozzle mixer 42 positioned therein. As best seen in FIGS. 2, 3a and 3b, first stage internal jet nozzle mixer 42 includes two sets of vanes 44 and 46 which are respectively inwardly and outwardly inclined to direct and mix together respectively the cooling air and the hot gases in chamber 40. Vanes 44 and 46 are positioned around a core terminating in a cone 47. As stated above, consistent with the Pratt & Whitney JT8D-217/219 Series jet engine design, the total of inwardly directed cooling air vanes 44 and outwardly directed hot gas vanes 46 respectively may number twelve each. This resulting admixture divides core 36 into a smaller cooler central core and twelve surrounding small cores of mixed hot gases and cooling air of different velocities which, nevertheless, are still extremely hot and produce an unacceptably high noise level. These smaller central and surrounding cores pass towards terminus 19 of the nozzle assembly for second stage mixing and cooling by second stage external jet nozzle mixer 20 of the present invention.

Second stage external jet nozzle mixer 20 and its component parts is illustrated in FIGS. 4-11. Mixer 20, as illustrated, may include twelve identical lobes 48 to equal in number the twelve cooling air vanes and the twelve hot gas vanes, and the twelve smaller hot gas cores of the internal mixer. For ease of manufacture, twelve sections, each including a lobe, is fabricated and the sections on either side of the lobes are welded together, such as identified by weld lines 50. Combined, the lobes extend from a circular section through a plurality of increasingly undulating portions, such as exemplified by cross-sections #1-#6. The transition from a round configuration at cross-section #5 to the scalloped or undulated configuration at cross-section #1 is a very smooth complex curve and, consequently, minimizes airflow distortion and drag and maximizes the mixing of the hot gases with neighboring air and thereby to reduce noise. This is achieved by using synchronized cross-sections and a plurality of weighted and blending splines between the cross-sections. Such a design is provided using state-of-the-art CAD software.

Figure 4:
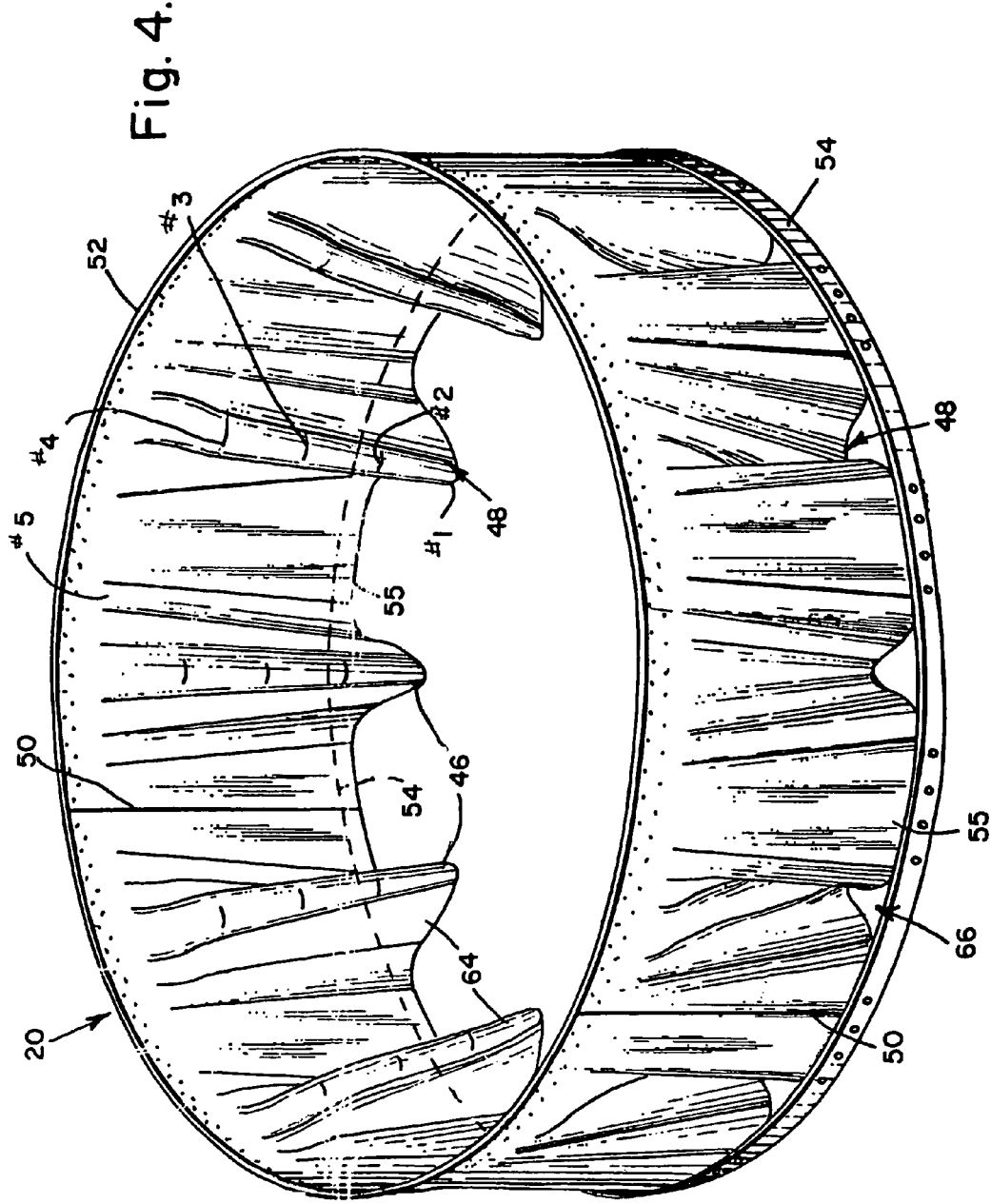
FIG. 4 is a perspective view of the second stage, external mixer assembly of the present invention in which its twelve identically shaped lobes are seen. The four undulating cross-sections, #1 through #4, which variously pass through the lobes of the mixer and which extend from the end of the mixer assembly towards its point of attachment to the terminus of the engine, are representative of all planes which pass through all of the lobes. A fifth cross-section #5, which is circular, extends about the band which anchors the mixer to the engine terminus. A sixth cross-section #6 is positioned behind the plane of the fifth cross-section #5, and is seen in subsequent figures. These six cross-sections are referred to in subsequent figures as defining planes numbered #1-#6.
Figure 6:
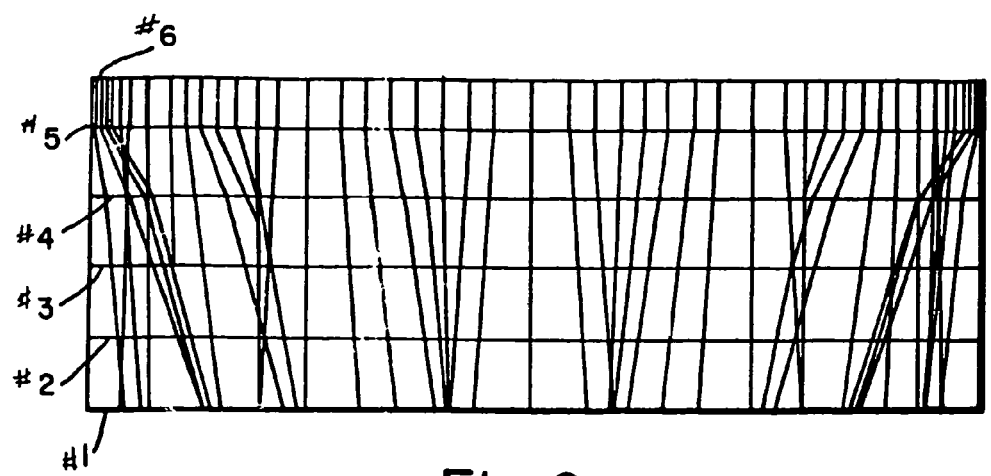
FIG. 6 is a side view, taken 90° with respect to the mixer shown in FIG. 5, of that mixer and its four undulating cross-sections and fifth circular cross-section along planes #1-#5. The circular configuration of the lobes at plane #5 extends generally cylindrically with the same general diameter to its end at plane #6.
Figure 5:
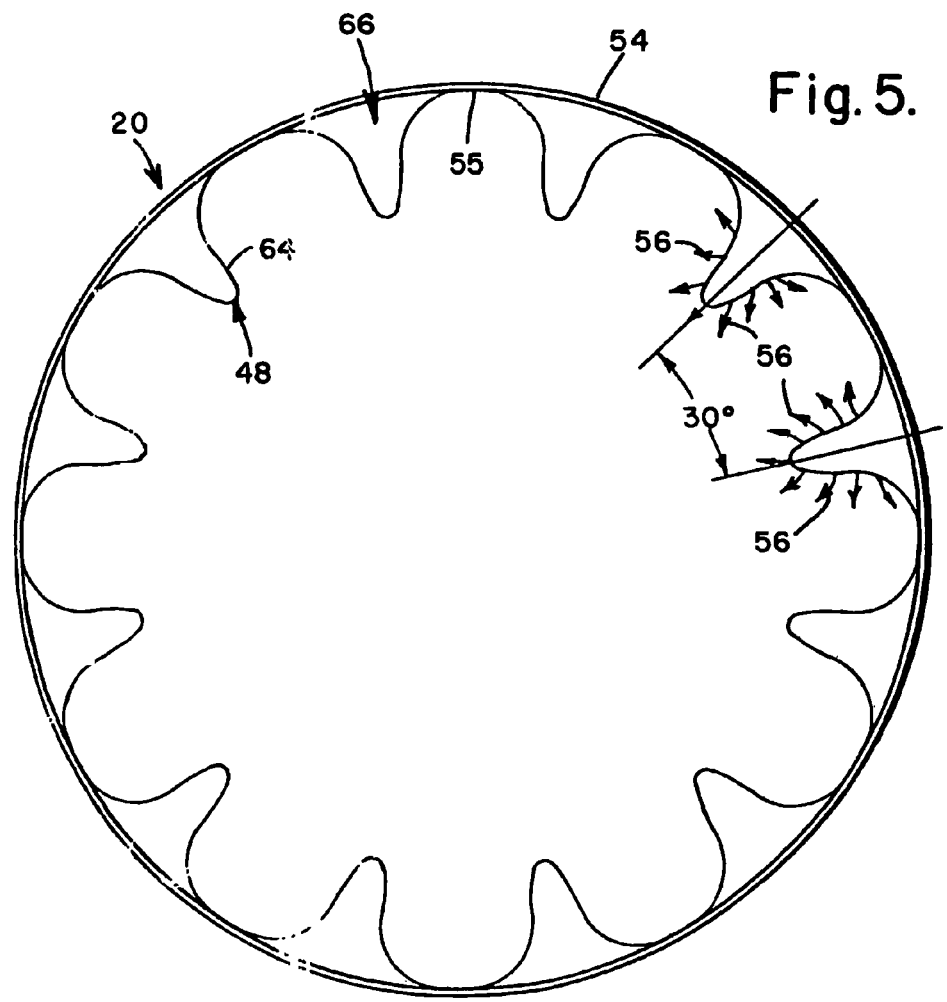
FIG. 5 is view of the external mixer of the present invention taken perpendicularly to and along the axis of the mixer assembly shown in FIG. 4, and also depicts how the lobes disperse and break up the hot gas/air mixture.

As stated above, the cross-sections, as portrayed on the interior surfaces of the lobes and depicted by shading in FIGS. 5-1 through 5-5, delimit interior mixer areas within the planes defined by the cross-sections, respectively of 1,100 square inches (7,097 square centimeters) at plane #1 (FIG. 5-1), 1,110 square inches (7,162 square centimeters) at plane #2 (FIG. 5-2), 1,120 square inches (7,226 square centimeters) at plane #3 (FIG. 5-4), 1,154 square inches (7,445 square centimeters) at plane #4 (FIG. 5-4), and 1,223 square inches (7,891 square centimeters) at plane #5 (FIG. 5-5). The cross-sectional areas from plane #5 to plane #1 decreases arithmetically, about 5%, 2.5%, 1.25%, etc.

The section extending between cross-sections #5 and #6 is an extension from the section adjacent cross-section #5 and is used to affix mixer 20 to the nozzle terminating the Pratt & Whitney JT8D-217/219 Series engine, and has an equivalent 1,223 square inch (7,891 square centimeter) area. An annular reinforcing support band 52 (see particularly FIG. 11) joins the lobes at their circularly shaped section adjacent cross-section #5, while a band ring 54 is joined to lobes 48 at their base sections 55 at their greatest undulation at cross-section #1.

FIG. 11 also illustrates the attachment of mixer 20 to nozzle assembly or tailpipe 18. Specifically, the mixer is secured to terminus 19 of the nozzle assembly and to a doubler ring 70. Both terminus 19 and the doubler ring are angled outwardly and, compared to prior nozzle assemblies, are shorter by approximately 5 inches.

Figure 7:
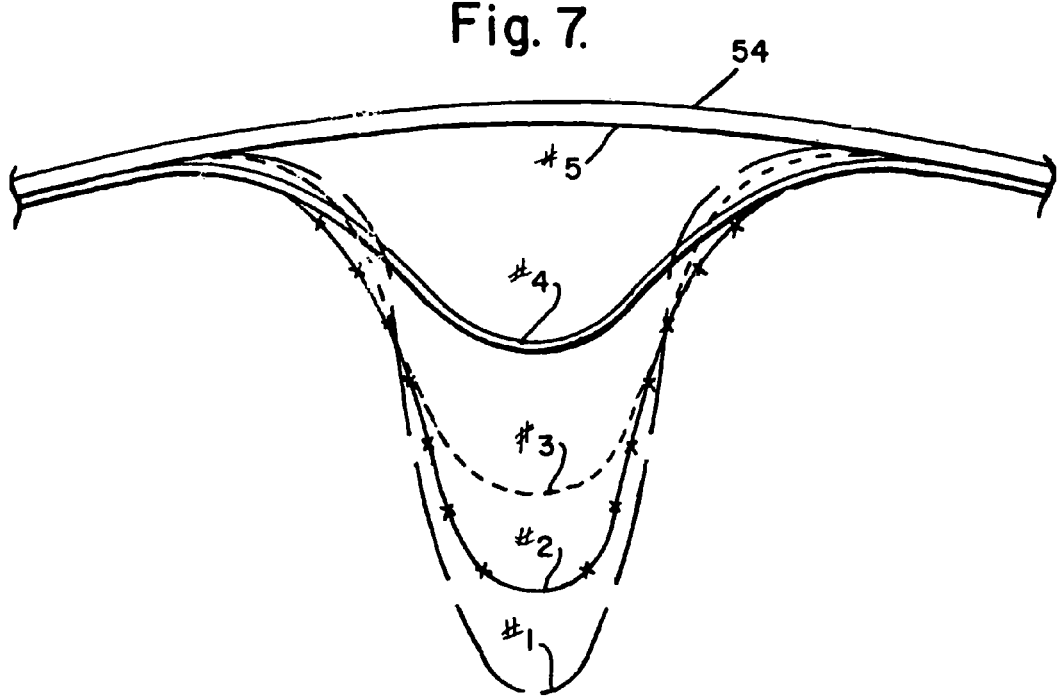
FIG. 7 is an enlarged view of a superimposition of the lobes and the same previously illustrated four undulating cross-sections and fifth circular cross-section as shown in FIGS. 4-6.
Figure 8:
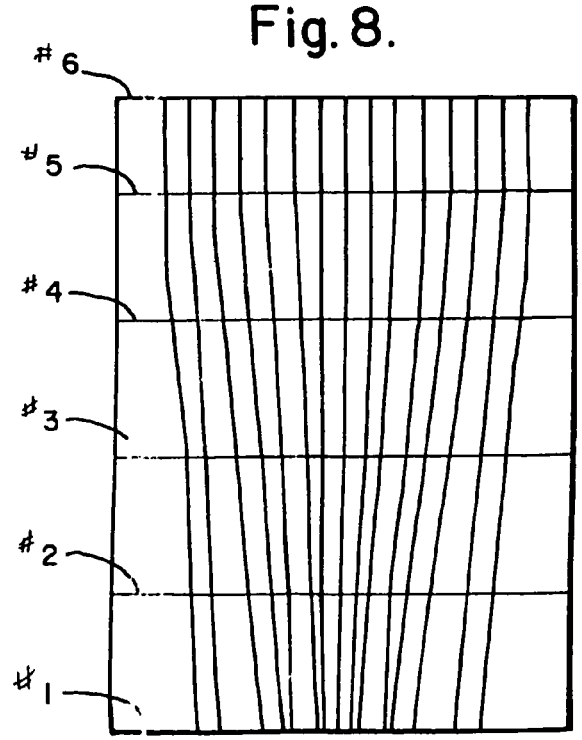
FIG. 8 is a view of the lobe shown in FIG. 7 looking down upon the apex of the lobe, in which the several cross-sections indicate the varying curvature of the lobe as its extends along the mixer axis through cross-sections or planes #1-#6.
Figure 9:
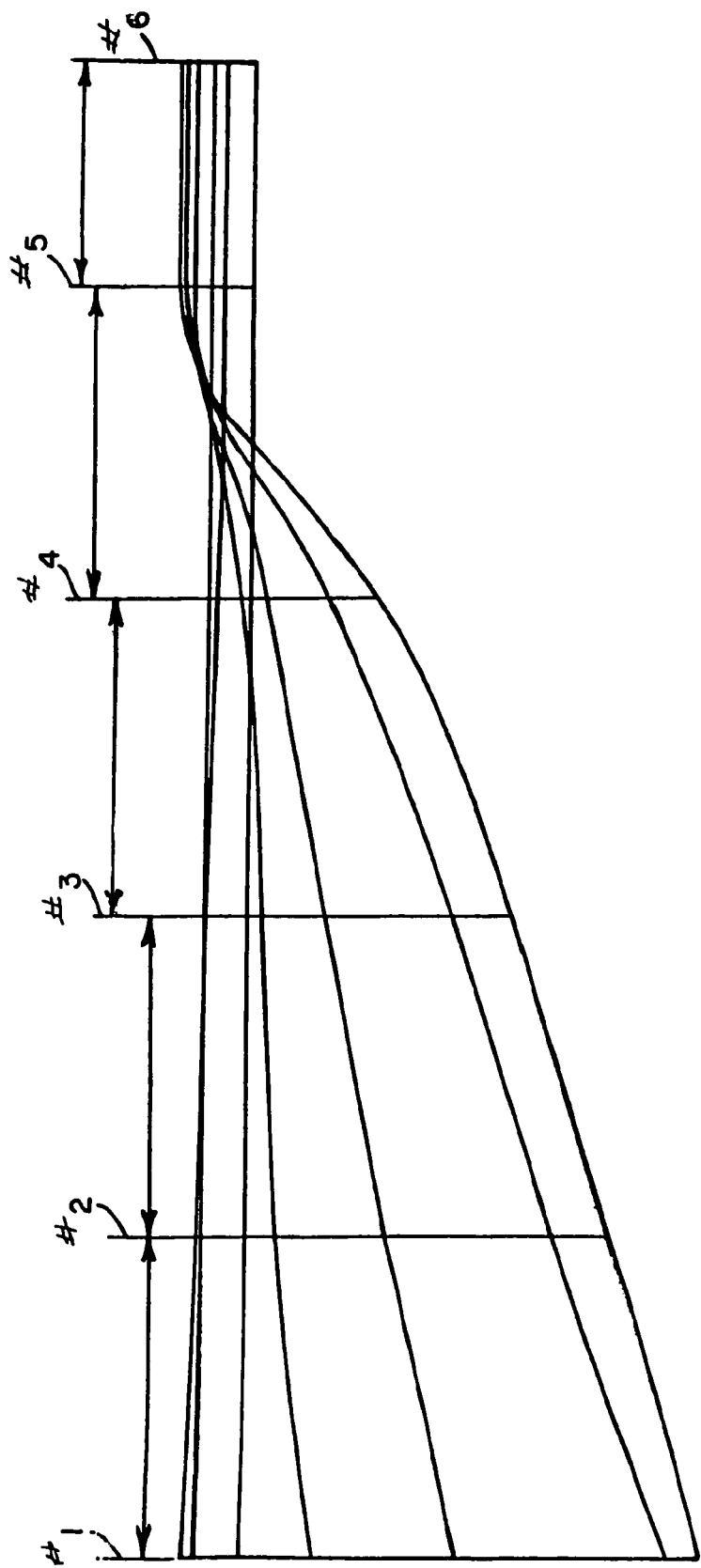
FIG. 9 is a side view of the lobe shown in FIGS. 4-8 and illustrates the several lobe curvatures as it extends along the mixer axis, with specific reference to planes 1-6 with its attaching end to the nozzle or tailpipe.
Figure 10:
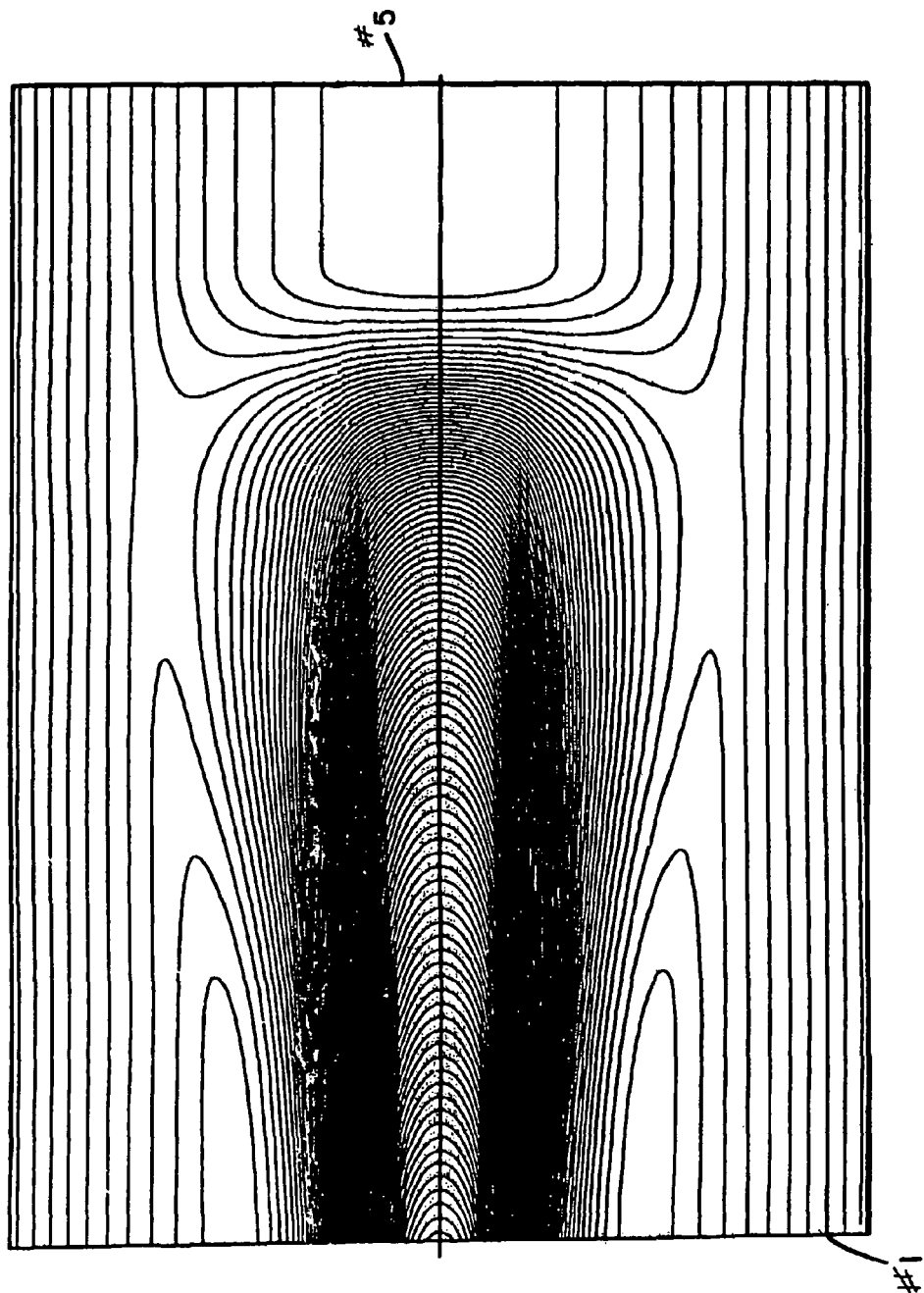
FIG. 10 depicts the contour lines of a lobe between its planes #1-#6, as viewed looking down upon the lobe.

As shown, for example in FIGS. 7 and 11, the interior surfaces of the lobes force the impinging hot gas-bypass cooling air mixture from internal mixer 42 in all directions towards the interior of internal mixer 20, that is, essentially 45° to 60° as illustrated by multiple arrow-headed lines 56 in FIG. 5, to effect a vigorous mixing of the gases. At the same time, additional ambient cooling air is forced from the exterior surfaces of the lobes to mix further with the internally mixed gases. These actions cause the smaller gas cores from internal mixer 42 to break into myriad forms which are both cooler and considerably noise attenuated. In part, the internal contours of the lobes act as flutes or channels 64 to produce a similar aerodynamic action as the skins of the airplane wings to produce a lifting effect. This lifting effect causes the primary hot and cold flows to mix before entering the nozzle. The external contours of the lobes, which act as chutes 66, are designed to act as a multitude of venturis, and thus to accelerate the cooler secondary flow of ambient air. This arrangement effectively forms an injector to force the cooler ambient secondary flow into the previously mixed primary flow as it exits the nozzle. This action further reduces the noise level.

In addition, dimples 72 are formed on both sides of band 54 of the external mixer and act as vortex generators to prevent the mixed gas flow from attaching to band 54 and thereby to enhance the mixing action.

This afore-mentioned acceleration also helps to increase the efficiency of the fuel-air burning in the engine. By producing an increased flow, the exhaust gases are more rapidly exhausted from the engine and thereby the need for the engine and its bypass compressor to expend energy in moving these gases is alleviated.

In addition, the lobes are elliptically shaped, being proportional to a 10×2.5 ellipse, plus or minus 2 inches (5 centimeters) major axis, and plus or minus 0.5 inch (1.3 centimeter) minor axis. These curved sides help resist distortion caused by the exhaust gas pressure.

Figure 13:
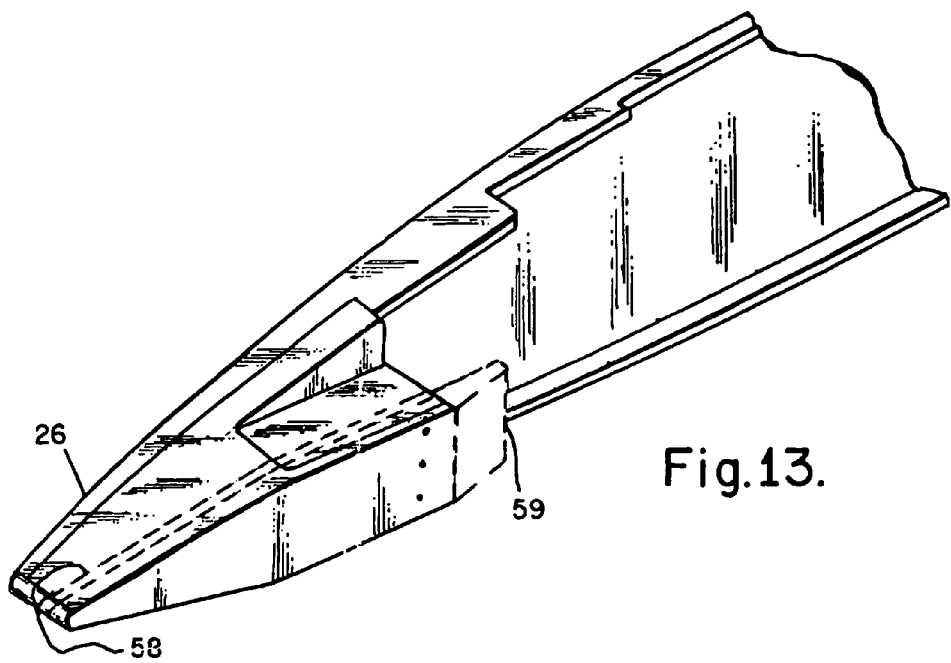
FIG. 13 is a perspective view of one of the STANG fairings as modified to accommodate the mixer of the present invention.

Because mixer 20, such as illustrated in FIGS. 4, 5, et seq., has a 1,065 sq. inch to 1,100 square inch (6,089 to 7,097 square centimeters) area encompassed by the lobes at plane #1 and a 1,223 square inch (7,891 square centimeters) area at plane #5, where the mixer is joined to nozzle assembly 18, it is possible to use the mixer without any modification of thrust reversers 22. As a result, it is necessary only to slightly reconfigure the structure covered by fairings 26. Such reconfiguration is depicted in FIGS. 12 and 13, and is effected by removing only a small portion from each of such structure, specifically that portion indicated by parallel dashed lines 58. Further, a tongue 59 is also removed.

The following points, although not exclusive, may be advanced in summary of the illustrated embodiments of the present invention.

A. As an important design parameter, the mixer has as short a length as is possible, e.g., 12 inches±3 inches (30.45 cm±8 cm). The lobe shape starts with a circular or rounded configuration at 39.7 inches (101 centimeters) and terminates with a scalloped or undulated configuration at the same diameter (39.7 inches or 101 centimeters) and an area of 1,065 sq. inches to 1,100 sq. inches (6,089 to 7,097 square centimeters), which matches the existing tailpipe area. By keeping the mixer short, it will not interfere with the existing thrust reverser doors at the end of the tailpipe.

B. The mixer is designed so that it can be attached to the existing tailpipe with minimum impact on exiting components, such as the thrust reverser, thrust reverser doors, stang fairings, outer fairings.

C. The mixer has elliptically shaped lobes whose shapes are proportional to a 10×2.5 ellipse (plus or minus 2 inch major axis, and plus or minus 0.5 inch minor axis). These curved sides help to resist distortion caused by exhaust gas pressure.

D. The transition in the lobes from a round to a scalloped shape forms a very smooth curve in order to minimize airflow distortion and drag and to maximize the mixing of the hot gases with neighboring air. This is achieved by using six synchronized cross-sections and many weighted and blending splines between the cross-sections. The design was achieved using state-of-the-art CAD software, Surfcam, from Surfware, Inc.

E. The cross-sectional area of the mixer, taken along its axis, decreases arithmetically, about 5%, 2.5%, 1.25%, etc., until its terminus is reached.

F. Rather than simply splitting the air flow, the mixer inner lobe surfaces ramps the exhaust gases inward and, at the same time, the outer surface draws outside air into the mixer using a type of NACA duct (airfoil air scoop) so that, when the hot gases and the cooling air is mixed, the exhaust noise is reduced.

G. The contour lines of the lobed surfaces form a uniform initial slope, which is desirable to ensure even pressure as the exhaust gases are redirected inward.

H. Testing of the final lobe shape design with models ensured that the lobes would be formed with relative ease from a flat sheet, and with minimum distortion or strain which would be otherwise caused by material stretching and compressing as the flat sheet is forced into the desired configuration. Such ease of formation is amenable to selection of the preferred material which comprises an aerospace alloy, Inconel 625, a difficult material to work.

I. Twelve lobes may be used to match the existing twelve vanes in the engine that swirl and spin the exhaust gases as they leave the engine. The twelve "hot spots" inside the tailpipe, which are produced by the existing vanes, are broken up by, for example, the twelve lobes of the present invention, thereby minimizing any undesirable hot spots.

J. The lobe shape forms a complex compound surface, with as large as possible employ of radii used at all locations so as to minimize drag and to allow for the smoothest possible gas flow redirection.

Figure 14:
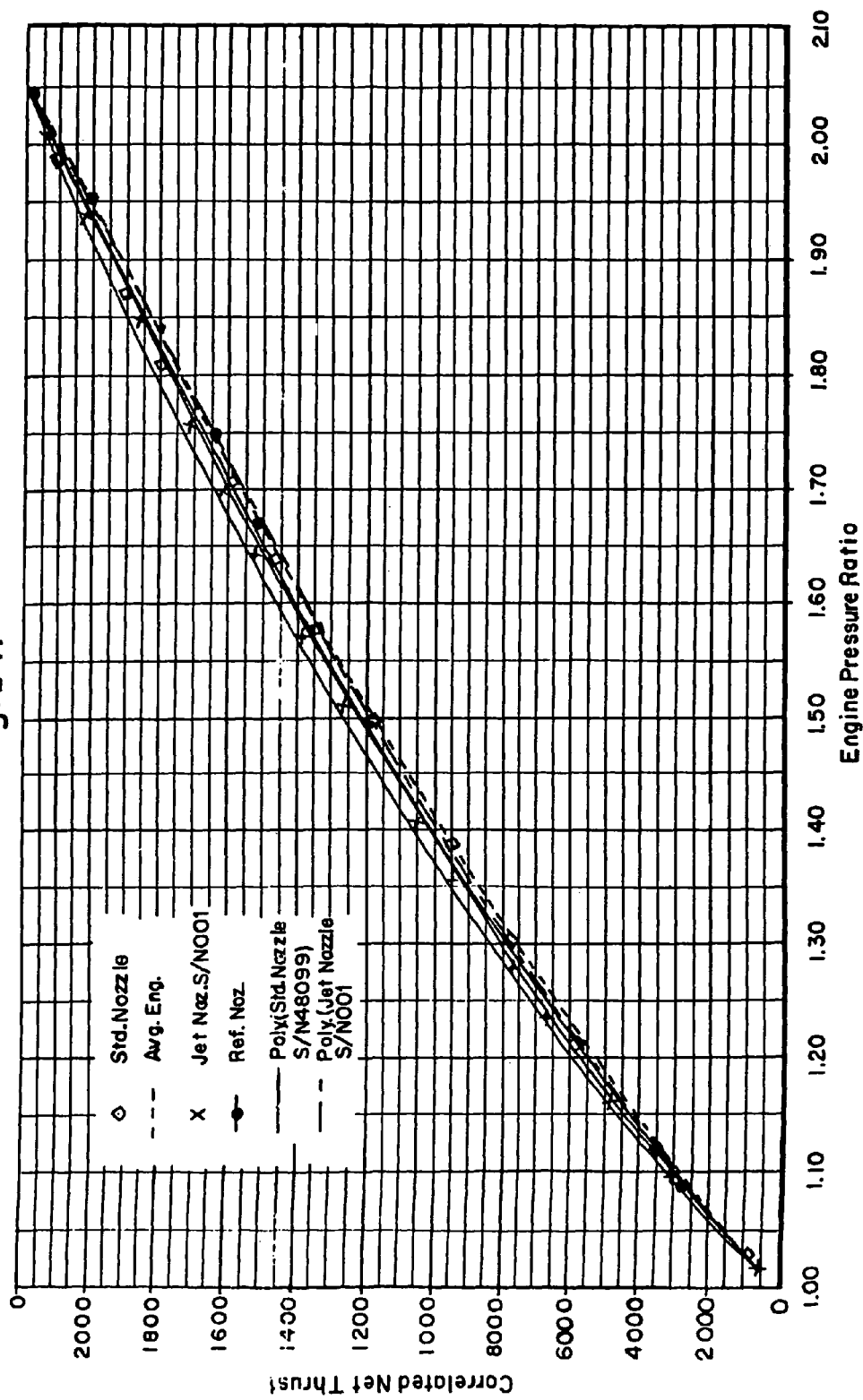
FIG. 14 is a graph attesting to the improvement in net thrust versus engine pressure ratio in a Pratt & Whitney JT8D-217/219 Series engine when use of the second stage external mixer of the present invention is compared to that of a standard nozzle, in which the engine pressure ratio is defined as the measure of engine exhaust pressure divided by ambient pressure.
Figure 15:
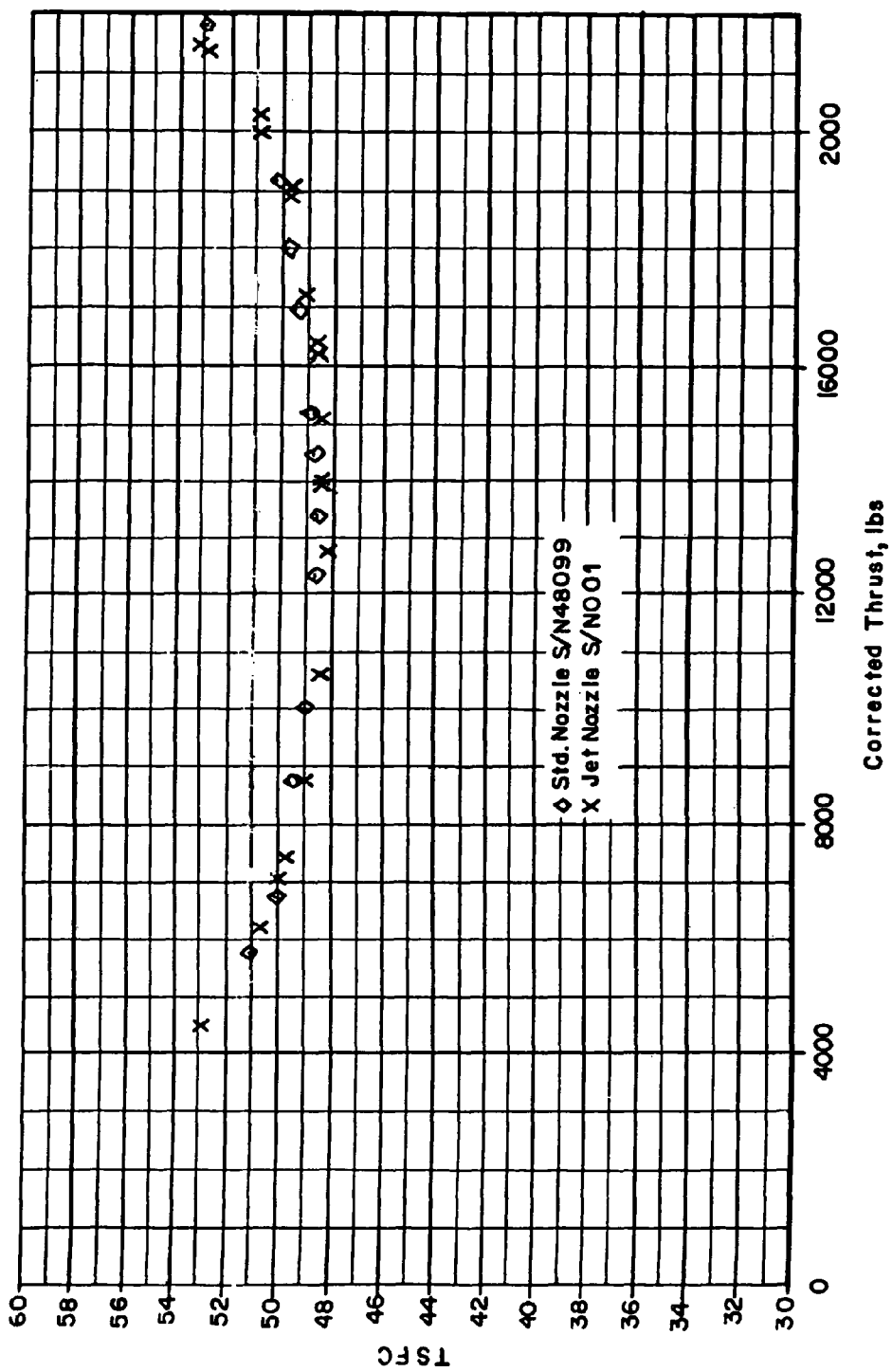
FIG. 15 is a graph demonstrating the improvement in TSFC (thrust specific fuel consumption) versus thrust in a Pratt & Whitney JT8D-217/219 Series engine when use of the second stage external mixer of the present invention is compared to that of a standard nozzle.
Figure 16:
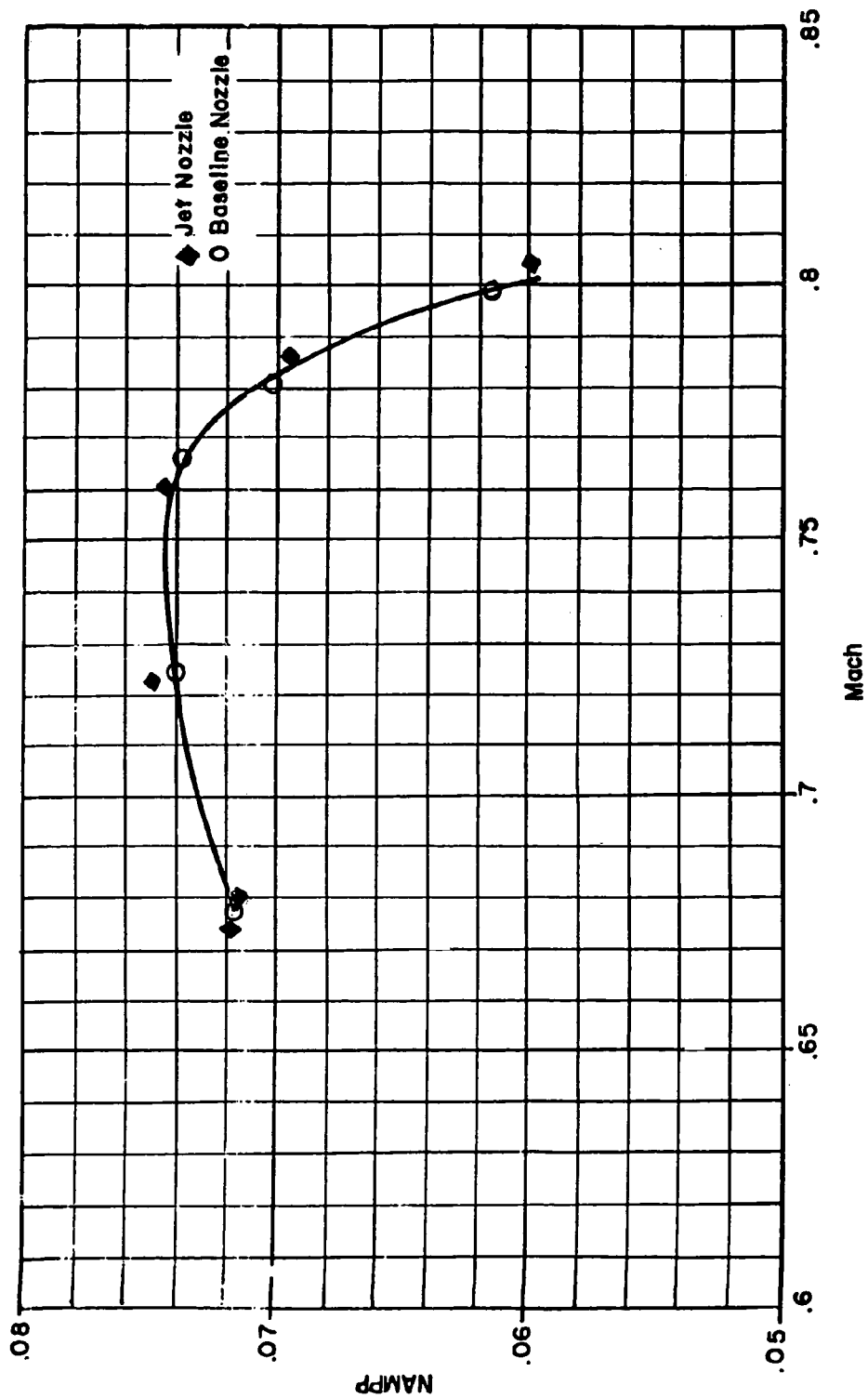
FIG. 16 is a graph of preliminary flight test data of a McDonnell-Douglas MD-80 aircraft as evidence of the improvement in fuel consumption in terms of NAMPP (nautical air miles per pound of fuel) versus mach in a Pratt & Whitney JT8D-217/219 Series engine when use of the second stage external mixer of the present invention is compared to that of a standard nozzle.

Preliminary testing of the present invention, as used in a Pratt & Whitney JT8D-217/219 Series jet engine, has disclosed decided improvements in performance as compared to conventional technology. Such data, as shown in FIGS. 14-16, are based upon present testing. It is therefore to be understood that final test results may evidence different data. Notwithstanding, as shown in these graphical representations of preliminary test data, the external or second stage mixer of the present invention demonstrates improved performance over that obtainable with conventional systems.

FIG. 14 discloses that, based upon a reasonable match for all engine parameters, such as engine revolutions per minute (rpm), exhaust gas temperature (EGT) and fuel pump data, the present invention demonstrates an increase in thrust at the mid range of engine pressure ratio (EPR), that is, engine exhaust pressure divided by ambient pressure. These tests were conducted by use of the external or second stage mixer of the present invention as compared to use of a standard nozzle (Serial Number 48099 as detailed in a United Technologies Corporation (UTC) document for its Pratt & Whitney engines, entitled "JT8D-209, -217, -217A, -217C, -219, TURBOFAN ENGINES ENGINE MANUAL PART No. 773128" bearing an initial issue date of Jul. 1, 1979 and revised Nov. 15, 2001.

FIG. 15 reveals that the present invention, within a mid thrust range of 7,000 to 15,000 pounds of thrust, improves upon the TFC (specific fuel consumption) by a factor of approximately 2% to 3%. The following example is given to demonstrate the economic benefits obtained by assuming a 2% increase in fuel consumption. An engine average fuel burn of 7,000 pounds of fuel per hour converts into an approximate consumption of 1,000 gallons per hour of fuel. Based upon an assumed yearly flight usage of a McDonnell-Douglas MD-80 aircraft of about 2,000 hours per year, the aircraft consumes about 2,000,000 gallons of fuel per year. At a cost of $1.00 per gallon, the annual fuel cost for such an aircraft would be $2,000,000. Therefore, for a 2% improvement in fuel consumption as provided by the present invention, the saving would amount to $40,000 per aircraft.

FIG. 16 compares the improvement in nautical air miles per pound of fuel (NAMPP) versus mach number for a McDonnell-Douglas MD-80 aircraft through use vis-a-vis non-use of the present invention. Here, preliminary flight data shows an increased NAMPP of the "JET nozzle" over all points on the curve when employing the present invention over its non-use "baseline nozzle."

It is to be understood that, in the foregoing exposition where dimensions, areas, etc., are expressed in English system units and, parenthetically, in metric system units, the English unit system shall take precedence in the event of any error in conversion from the English unit system to the metric unit system.

Although the invention has been described with respect to a particular embodiment thereof, it should be realized that various changes and modifications may be made therein without departing from the spirit and scope of the invention.

What is claimed is:

1. An engine assembly, comprising:
    an engine enclosed within a housing, said housing having an exhaust aperture;
    a first stage mixer within said housing, said first stage mixer including first stage lobes to mix exhaust gas with cooling air;
    a thrust reverser coupled to said housing and having a stowed position fixed relative to said housing and having a deployed position located behind said housing at a predetermined position for receiving gas flow directly from said exhaust aperture without a second stage mixer;
    a second stage mixer coupled to said exhaust aperture of said housing to receive gas exhausted from said first stage mixer, said second stage mixer having second stage undulating lobes having an periphery to mix exhaust gas with cooling air,
    said second stage mixer containing the same number of lobes as said first mixer,
    said second stage mixer being unenclosed by said housing and having an exterior in contact with the ambient air to allow the air to enter said second stage mixer and mix with the gas from said first stage mixer,
    said second stage mixer having a trailing edge forming the exit terminus for the gas flow;
    said bucket-type thrust reverser in the deployed position being positioned downstream of the exit terminus to reverse the gas flow; and
    said second stage mixer having additional mixing elements positioned at said trailing edge of said second stage mixer; wherein
    said additional mixing elements include a separate band surrounding the outer periphery of said undulating lobes at the said trailing edge, and said band including projections to further mix the exhaust gas.

2. An engine assembly according to claim 1, wherein
    said bucket-type thrust reverser when stowed does not overlap the second stage mixer and is configured and arranged such that said deployed position is located at a predetermined position for receiving gas flow directly from said exhaust aperture without a second stage noise reducing device.

3. An engine assembly according to claim 1, wherein
    said second stage mixer includes:
    leading edge constructed and arranged to be coupled to the exhaust aperture of a tubular housing to receive gas exhausted from a first stage mixer;
    a trailing edge forming the exit terminus for the gas flow;
    a middle section coupled between said leading and trailing edges, said middle section having a plurality of lobes and being constructed and arranged to be at least partially outside the tubular housing and to have an exterior in contact with the ambient air to allow the ambient air to mix with the gas exhausted from the first stage mixer to further reduce noise and increase fuel efficiency, and
    said trailing edge is constructed and arranged so that a thrust reverser in a deployed position is positioned downstream of the exit terminus of the gas flow.

4. A method of forming an engine assembly, comprising:
    providing an engine enclosed within a housing and a first stage mixer coupled to the engine and being located within the housing, the first stage mixer including first stage elements to mix exhaust gas with cooling air, the housing having an exhaust aperture,
    providing a bucket-type thrust reverser coupled to the housing and moving between a stowed position fixed relative to the housing and a deployed position being positioned downstream of the exhaust aperture to reverse the gas flow with the deployed position designed as a predetermined location for receiving the gas flow directly from the exhaust aperture without a second stage noise reducing device; and
    attaching a second stage noise reducing device with undulating mixer lobes having an outer periphery to the exhaust aperture of the housing to receive gas exhausted from the first stage mixer, the second stage noise reducing device being unenclosed by the housing and having an exterior in contact with the ambient air, the second stage noise reducing device having a trailing edge forming the exit terminus for the gas flow, said trailing edge of the second stage mixer containing additional mixing elements, said additional mixing elements include a separate band surrounding the outer periphery of said undulating lobes at the said trailing edge, and said band including projections to further mix the exhaust gas, and the second stage noise reducing device permitting the said thrust reverser to continue moving between the stowed position and the predetermined deployed position, with the deployed position being positioned downstream of the exit terminus to reverse the gas flow.

5. A method of forming an engine assembly, comprising:
    providing an engine enclosed within a housing, which is coupled to a bucket-type thrust reverser, and a first stage mixer coupled to the engine and being located within the housing, the first stage mixer including first stage elements to mix exhaust gas with cooling air, the housing having an exhaust aperture, the thrust reverser coupled to the housing and moving between a stowed position fixed relative to the housing and a deployed position being positioned downstream of the exhaust aperture to reverse the gas flow;
    determining performance characteristics of the engine; and
    modifying the determined performance characteristics of the engine by attaching a second stage noise reducing device with undulating mixer lobes having an outer periphery to the exhaust aperture of the housing to receive gas exhausted from the first stage mixer, the second stage noise reducing device being unenclosed by the housing and having an exterior in contact with the ambient air, the second stage noise reducing device having a trailing edge forming the exit terminus for the gas flow, said trailing edge of the second stage mixer containing additional mixing elements, said additional mixing elements include a separate band surrounding the outer periphery of said undulating lobes at the said trailing edge, and said band including projections to further mix the exhaust gas and the second stage noise reducing device permitting the bucket-type thrust reverser to continue moving between the stowed position and the deployed position, with the deployed position being positioned downstream of the exit terminus to reverse the gas flow.

* * * * *